Sept. 19, 1961   K. E. WITZIG ET AL   3,000,273
WORKTABLE

Filed Dec. 17, 1956   2 Sheets-Sheet 1

United States Patent Office 3,000,273
Patented Sept. 19, 1961

3,000,273
WORKTABLE
Karl Emil Witzig, 42 Im Kienle, Stuttgart, Germany, and Rudolf Frank, 15 Georg-Kroppstrasse, Ludwigsburg, Germany
Filed Dec. 17, 1956, Ser. No. 628,617
Claims priority, application Germany Dec. 17, 1955
12 Claims. (Cl. 90—15.1)

The invention refers to a turnable worktable with several working positions in which the work pieces are machined with the aid of tools displaceable toward, and away from, the worktable. With this worktable the work gripping members may be arranged, in known manner, either fixedly or movably with respect to the worktable. In this latter case, the work gripping members may turn automatically about their own axes when the worktable turns about its axis. The work gripping members may thereby turn through such an angle that the work pieces will extend in the same direction irrespective of the angular position of the worktable.

With the known worktables of the aforesaid kind the work gripping members extend above the worktable so that, when machining the work pieces, the chips thereby produced fall upon the table and additional work has to be done for cleaning the table and removing the chips. If the chips are not all removed, and this occurs very often in practice, the work pieces eventually are not correctly gripped so that they are only defectively machined in certain cases. It is an object of this invention to eliminate these drawbacks.

With the known arrangements there exists also the danger of the work pieces being definitively deformed when the jaws are too heavily compressed in the case of a work piece which is hollowed out until the outer walls are only very thin. It is also possible that an exactly circular hole made in a work piece which has been previously deformed by the jaws in the aforesaid manner becomes irregular after the load having been removed since the work piece then takes up its former shape.

It is, therefore, the main object of this invention to provide a worktable of the general character described with which the chips can be carried off in a very efficient manner.

Another object of this invention is to provide a worktable of the aforedescribed kind with which the chips fall automatically into the chip receiver situated beneath the work gripping members.

Yet another object of this invention is to provide a worktable of the above type with which it is made sure that the position of the jaws is independent of the magnitude and efficiency of the jaw-closing force produced by the drive means.

Still another object of this invention is to provide a worktable of the character above-described with which the position of the jaws can be adjusted.

A further object of the invention is to provide an improved worktable with which the gripping jaws remain in their position until the sequence of operations is terminated, even if the drive means are not effective anymore.

A further object of the invention is to provide an improved worktable of the abovedescribed character with which there does not exist the danger of the work pieces being definitively deformed when the jaws are too heavily compressed.

With these and other objects in view which will appear as the description proceeds, the invention consists of certain novel features of construction as will be particularly pointed out in the appended claims.

The manner of carrying the invention into effect is hereinafter described by way of example, reference being had to the accompanying drawings in which.

Figure 1:
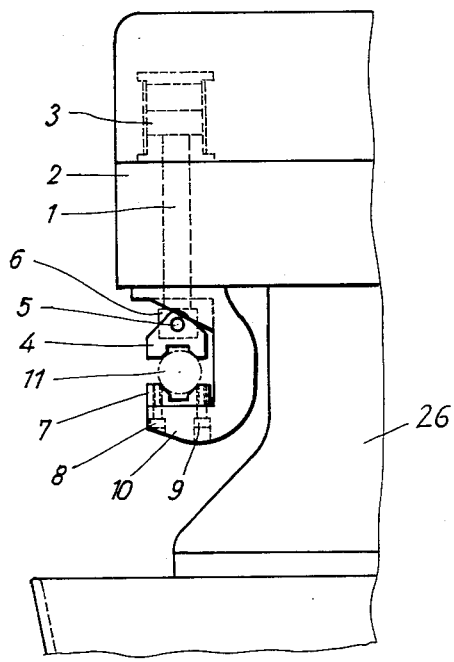
FIG. 1 is a fragmentary schematical side view of a device according to the invention.
Figure 2:
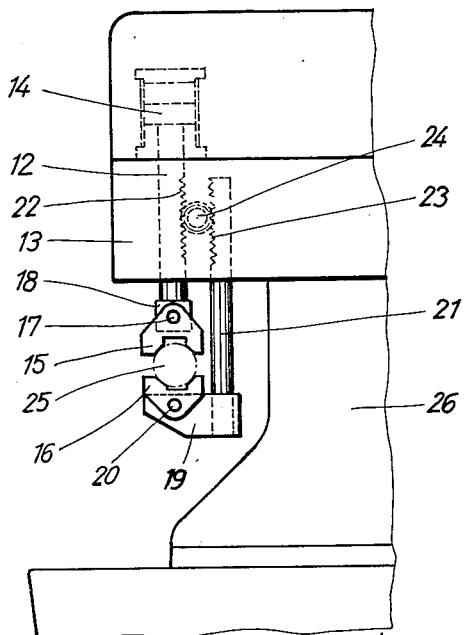
FIG. 2 is a fragmentary schematical side view of another embodiment of the invention and FIG. 3 is a partly sectional side view of a device according to the invention with the particulars of the new self-locking mechanism.

In the embodiments shown in FIGS. 1 and 2 the work gripping members are so arranged on the worktable as to extend downwardly, whereas the work pieces to be machined are gripped on the lower end of the work gripping means.

In FIG. 1 the spindle 1 is so displaceably arranged on the worktable 2 as to extend or depend therefrom downwardly. The worktable 2 is supported on column 26 turnable about its axis. For displacing the spindle 1 a hydraulic drive 3 is made provision for. 4 is a gripping jaw which is mounted on the spindle 1 with the aid of the holding member 6 for turning movement about the bolt 5. 7 is a fixedly arranged gripping jaw which is fixed to the carrier member 10 by means of the screws 8 and 9. The jaws 4 and 7 serve to cooperatingly grip the work piece 11.

In the embodiment according to FIG. 2 the spindle 12 is so arranged on the worktable 13 as to extend or depend therefrom downwardly. The spindle 12 can be displaced by means of the hydraulic drive 14. There are provided two displaceable jaws 15 and 16, of which the one shown at 15 is turnably arranged on the spindle 12 with the aid of the bolt 17 and the holding member 18, whereas the jaw 16 is movably mounted on a carrier member 19 with the aid of the bolt 20. The spindle 12 is coupled with the other spindle 21 carrying the jaw 16 by means of a gearing which imparts to the spindle 21 a movement in a direction opposite to that of the spindle 12. The gearing consists of the toothed gear 24 and the racks 22 and 23 which are made integrally with the respective spindles. The two jaws are thereby movable against one another and in a direction parallel to the axis of the worktable, the arrangement being such that the work piece 25 is thereby gripped equally by jaws 15 and 16. 26 is a supporting column which supports the worktable 13 turnable about its axis. In machining the work piece 25 the chips directly fall into the chip receiver situated below the worktable.

Figure 3:
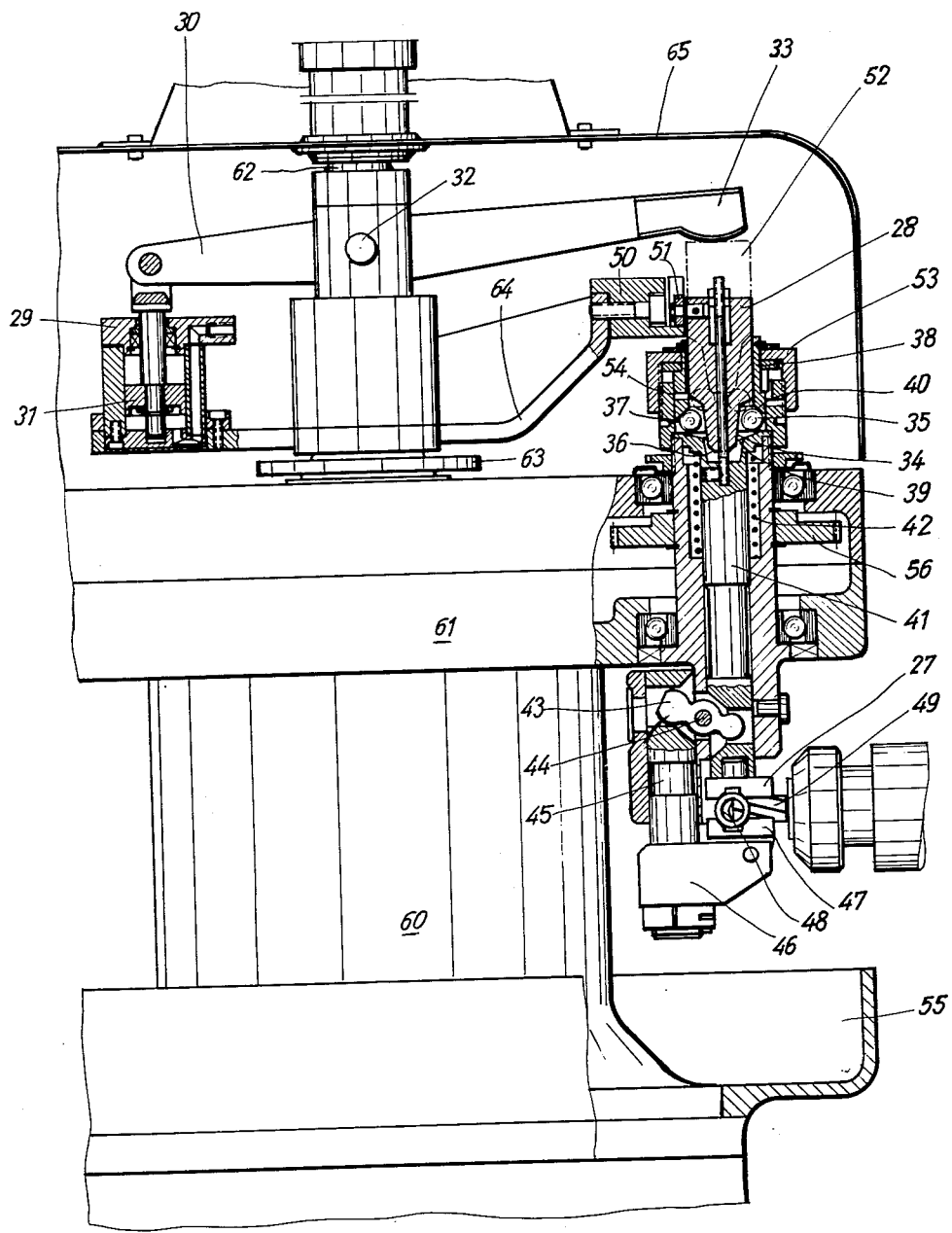

FIG. 3 shows a further modification of the present invention in which the worktable 61 is turnably mounted on a stationary column 60. The column ends at the upper end thereof in a shaft 62 concentrically arranged with the column 60 which, together with the disc 63 pivotally supports the worktable 61 for turning movement about the axis thereof. Fixedly mounted on the shaft 62 is a bracket 64 extending to opposite sides of the shaft axis and carrying on one end thereof a hydraulic cylinder 29 in which a piston 31 is mounted for reciprocation, and at the other end thereof a cam disc 50. Piston 31 of the hydraulic drive raises the lever 30 which is pivoted about the bolt 32 thereby pressing the load transmitting member 28 downwards into the position shown in FIG. 3 with full lines. The load transmitting member 28 has a frusto-conical surface 34 which coacts with balls 35 through which the gripping motion is transmitted to the jaw 27. In the rest position the balls 35 bear against a further, more inclined frustro-conical surface 36 at the load transmitting member 28. When the load transmitting member 28 descends, the balls 35 leave this surface and roll upon the conical surface 34 until entering into the recesses 37 on the upper and lower side of which there are provided surfaces 39 and 40 which are inclined against one another, the surface 39 being on the upper end of the spindle 41 and the surface 40 on the lower end of a bush 38 fixedly connected with a nut 53. By this means, the spindle 41 carrying the jaw 27 is displaced downwardly through the medium of the balls 35 and against the action of the spring 42. The spindle 41 pivots the tilting lever 43 about the bolt 44 so that the other spindle 45 is moved together with the carrier member 46 and the jaw 47 parallel to the axis of the worktable and to the movement of the spindle 41 but in a direction opposite thereto. These movements are such that the work piece 48 is gripped evenly thereby taking up the position in which it is to be acted upon by the tool 49.

When the piston 31 withdraws downwardly and no pressure is exerted anymore on the load transmitting member 28, the balls 35 and, therefore, also the load transmitting member 28 remain, because of the above described shape of the different conical and inclined surfaces, and their self-locking effect in the jaw-closing position until the load transmitting member is raised when arriving into the work-removing position of the worktable. In order to raise the load transmitting member, there is provided a return mechanism which consists of an opening cam 50 with which the follower roll 51 connected with the load transmitting member 28 coacts when the sequence of operations is terminated so that the load transmitting member then reaches the position 52 indicated with dotted lines. Thereby, the spindle 41 is moved under the influence of the pressure spring 42 together with the jaw 27 upwards and the balls 35 are pressed out of the recesses 37. At the same time the jaw 47 moves downwards so that the work piece is not gripped anymore.

By this means a predetermined and adjustable jaw position is insured independently of the magnitude and efficiency of the load. The jaws remain in their position until the sequence of operations is terminated and produce the gripping effect even if the drive means are not effective anymore.

The position of the load transmitting member 28 and of the organ carrying the jaw 27 can be changed so that the operating position of the jaws is adjustable with respect to one another. To this purpose there is provided a nut 53 which is fixedly connected to the bush 38 and which can be screwed up and down on the sleeve 54, the position of the bush 38 with the inclined surface 40 determining the operating position of the balls 35, of the spindles 41 and 45 and of the jaws 27 and 47.

The chip receiver is shown at 55. The toothed gear 56 serves to automatically rotate the work gripping assembly 27 and 44—47 about the axis of the spindle 41 when the worktable turns about its axis so that a work piece held by the work gripping assembly will turn about the axis of spindle 41 through the same angle through which the worktable turns, but in opposite direction.

In lieu of the hydraulic drive and the lever cooperating therewith there may be provided also a jaw-closing cam with which a suitable follower roller situated on the top end of the load transmitting member cooperates. The jaw-closing movement may also be transmitted through springs, or instead of the hydraulic drive there may be used a compressed-air drive or an electric motor or an electromagnet. The organ initiating the jaw-closing movement may be situated in the work-gripping position, in which the work to be machined is gripped or in any other position whereby in this latter case there have to be provided, in addition, suitable motion-transmitting members. The foregoing description is directed solely towards the constructions illustrated, but we desire it to be understood that we reserve the privilege of resorting to all mechanical changes to which the device is susceptible, the invention being defined and limited only by the terms of the appended claims.

Having thus described the invention, what we claim as new and desire to secure by Letters Patent is:

1. In a machine tool, in combination, support means; a worktable turnably carried by said support means for turning movement about a given axis so as to pass through several working positions, said axis extending upwardly and said worktable having a downwardly directed surface surrounding said axis, drive means for turning said workable about said axis; and a plurality of work gripping means for holding work pieces to be machined during operation, said plurality of work gripping means being carried by said worktable and distributed about its axis, said plurality of work gripping means extending downwardly from said downwardly directed surface of said worktable and each of said work gripping means having at least one work engaging surface which is directed downwardly away from said downwardly directed surface of said worktable.

2. In an apparatus as recited in claim 1, said plurality of work gripping means respectively being turnable with respect to said table about a plurality of axes substantially parallel to said first-mentioned axis and transmission means interconnecting said worktable and said plurality of work gripping means for simultaneously turning the latter respectively about said plurality of axes.

3. In an apparatus as recited in claim 2, said transmission means turning said work gripping means about said plurality of axes through the same angle through which said worktable turns about said first-mentioned axis and in a direction opposite to the direction in which said worktable turns, so that work pieces held by said work gripping means will extend in the same direction irrespective of the angular position of said worktable and said work gripping means.

4. The apparatus set forth in claim 1, wherein each of said work gripping means carries two gripping jaws of which at least one is movable.

5. The apparatus set forth in claim 4, wherein both of said gripping jaws being movable in directions parallel to said first-mentioned axis and opposite to one another.

6. The apparatus set forth in claim 5, and, in combination therewith, means in operative connection with both said movable gripping jaws, said means imparting to said gripping jaws, respectively, such a movement that the respective work piece is gripped centrally between said gripping jaws.

7. The apparatus set forth in claim 4, wherein each of said work gripping means includes a spindle carrying said movable gripping jaw; and drive means cooperating with said spindle to move the same axially.

8. The apparatus set forth in claim 7, wherein a pair of spindles are connected with said jaws and one of said spindles is directly connected with said drive means serving to impart axial movement to said one spindle, whereas the other of said spindles is connected with said one spindle by means of a gearing, said gearing imparting to said other spindle a movement in a direction opposite to that of said one spindle.

9. The apparatus set forth in claim 7, and, in combination therewith, an irreversible locking mechanism operatively connected with said movable jaw, said irreversible locking mechanism making sure that the position of the jaws be independent of the magnitude and efficiency of the jaw-closing pressure produced by said drive means.

10. In a machine tool, in combination, a worktable having a downwardly directed surface, the machine tool having a free open space beneath said surface; a pair of cooperating work-gripping jaws located beneath said surface in said space each of said jaws having a work-gripping face; and means extending from said jaws upwardly to and carried by said worktable, said means supporting said jaws and operatively connected to at least one of said jaws for moving the latter to and from the other of said jaws while moving said work-gripping face on said one jaw parallel to itself for gripping and releasing a work piece, respectively, so that chips falling from the work piece will fall downwardly in said space without engaging the work table or mechanism located at an elevation higher than said jaws.

11. In a machine tool as recited in claim 10, and an open-top receptacle located in said space beneath said jaws for catching the chips.

12. In a machine tool, in combination, a worktable having a downwardly directed surface; a first spindle supported by said table for vertical axial movement and extending downwardly beyond said surface; a downwardly directed jaw carried by said first spindle; a second spindle parallel to said first spindle; an upwardly directed jaw carried by said second spindle and located beneath said downwardly directed jaw, both of said jaws being located beneath said surface; transmission means interconnected with said spindles for moving said second spindle axially simultaneously with and in a direction opposite to the movement of said first spindle, so that a work piece may be gripped between said jaws when said first spindle moves downwardly and released from said jaws when said first spindle moves upwardly; moving means carried by said worktable and cooperating with said first spindle for moving the same downwardly to a work-gripping position; and means cooperating with said first spindle for releasably retaining the latter in said work-gripping position thereof independently of said moving means even when the latter is out of operative engagement with said first spindle.

References Cited in the file of this patent

UNITED STATES PATENTS

| | | |
|---|---|---|
| 965,807 | Garvey | July 26, 1910 |
| 1,671,354 | De Leeuw | May 29, 1928 |
| 2,405,941 | Clausing | Aug. 20, 1946 |
| 2,546,504 | Head | Mar. 27, 1951 |
| 2,619,878 | Herzberg | Dec. 2, 1952 |
| 2,751,823 | Freter | June 26, 1956 |

FOREIGN PATENTS

| | | |
|---|---|---|
| 630,874 | Germany | June 8, 1936 |